US007024459B2

(12) United States Patent
McNamara et al.

(10) Patent No.: US 7,024,459 B2
(45) Date of Patent: Apr. 4, 2006

(54) SCALABLE NOTIFICATION DELIVERY SERVICE

(75) Inventors: Donald James McNamara, Woodinville, WA (US); Frank Stephen Serdy, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 709 days.

(21) Appl. No.: 10/086,792

(22) Filed: Feb. 28, 2002

(65) Prior Publication Data
US 2003/0163533 A1    Aug. 28, 2003

(51) Int. Cl.
    *G06F 15/16* (2006.01)
(52) U.S. Cl. .................................... 709/206; 709/203
(58) Field of Classification Search ............. 709/203, 709/206, 238
    See application file for complete search history.

(56) References Cited

U.S. PATENT DOCUMENTS

| 5,987,106 | A  | * | 11/1999 | Kitamura ............... 379/110.01 |
| 6,011,844 | A  | * | 1/2000  | Uppaluru et al. ....... 379/220.01 |
| 6,021,433 | A  | * | 2/2000  | Payne et al. ................ 709/219 |
| 6,253,239 | B1 | * | 6/2001  | Shklar et al. ............... 709/217 |
| 6,341,270 | B1 | * | 1/2002  | Esposito et al. .............. 705/26 |
| 6,353,661 | B1 | * | 3/2002  | Bailey, III ............... 379/93.25 |
| 6,385,644 | B1 | * | 5/2002  | Devine et al. .............. 709/206 |
| 6,421,781 | B1 | * | 7/2002  | Fox et al. ..................... 713/201 |
| 6,513,026 | B1 | * | 1/2003  | Horvitz et al. ................ 706/46 |
| 6,526,335 | B1 | * | 2/2003  | Treyz et al. .................... 701/1 |
| 6,697,924 | B1 | * | 2/2004  | Swank ........................ 711/163 |
| 6,854,035 | B1 | * | 2/2005  | Dunham et al. ............ 711/117 |
| 2002/0019758 | A1 | * | 2/2002 | Scarpelli ........................ 705/7 |

(Continued)

OTHER PUBLICATIONS

TDB-ACC-No: NN86023759—IBM Technical Disclosure Bulletin, Feb. 1, 1986; vol. 28, Issue 9, p. 3759-3760.*
Title: The Integration of SMS with Voice Based Technology Authors: Peersman, G.; Cvetkovic, S.R.; Smythe, C.; Spear, H.; Griffiths, P. Conference Title: IEE Colloquium on Advances in Interactive Voice Technologies for Telecommunication Services (Ref. No. 1997/147) pp. 9/1-7 Date: Jun. 12, 1997; Conference Location: London, UK Publication Date: 1997 pp.: 86 pages.

(Continued)

*Primary Examiner*—Beatriz Prieto
*Assistant Examiner*—Michael D. Meucci
(74) *Attorney, Agent, or Firm*—Workman Nydegger

(57) ABSTRACT

A notification service that efficiently scales to the number and variety of notifications and users being serviced. The notification service is separated into three general functional components. A listener component receives a notification in a network format suitable for transmitting the notification over a network. The listener component translates the notification into an internal processing format used by the notification service. The notification is then forwarded to a routing component that determines a category associated with the notification, and performs a set of one or more operations on the notification based on its category. Finally, the notification service is forwarded to a delivery service for delivery of the notification to the notification sink. The listener component, the routing component, and the delivery component may each be scaled in order to adjust for current processing loads using load balancing functionality.

38 Claims, 11 Drawing Sheets

U.S. PATENT DOCUMENTS

2002/0026514 A1* 2/2002 Ellis et al. ............... 709/227
2002/0083136 A1* 6/2002 Whitten .................. 709/205
2002/0120711 A1* 8/2002 Bantz et al. ............. 709/217
2002/0178243 A1* 11/2002 Collins .................... 709/223
2003/0018766 A1* 1/2003 Duvvuru ................. 709/223
2003/0045273 A1* 3/2003 Pyhalammi et al. ..... 455/412

OTHER PUBLICATIONS

Title: Voice Processing on the Mobile Network Author: Fennell, J.K. Journal: Telecommunications (International Edition), vol. 27, No. 2 Publication Date: Jul.-Sep. 2001 pp.: 82, 84-86.

* cited by examiner

SCALABLE NOTIFICATION DELIVERY SERVICE

BACKGROUND OF THE INVENTION

1. The Field of the Invention

The present invention relates to the field of notification technology. Specifically, the present invention relates to methods, systems and computer program products for delivering notifications in a manner that efficiently scales to the number and variety of notifications and users being serviced by the notifications.

2. Background and Related Art

Most would agree that intelligent decision-making requires access to relevant and timely information. Computer networking has greatly enhanced our ability to access such information, resulting in this modern era often being termed "the information age".

Some access to information is synchronous or "pull-oriented". In other words, information is accessed each time a request for the information is submitted. For example, users may use Internet-enabled computers to request access to information such as Web pages, e-mail accounts, calendaring applications, or the like. In this manner, synchronous access allows for broad control over the type of information accessed.

There are some cases in which it may be inefficient to synchronously access information. For example, some information changes relatively often. A user may desire to know the current information despite such frequent changes. It that case, synchronous access would require frequent requests for updated information. Such information may include, for example, stock prices. In addition, perhaps the user does not care about the information unless the information has a certain value. For example, perhaps a user is not interested in a certain fifteen-year mortgage rate unless the value drops below a threshold percentage, at which time the user may consider refinancing. In this case, synchronous access might result in numerous requests for updated information even if the interest rate was not yet low enough to be interesting to the user.

In order to avoid these inefficiencies, computer networks may also be used to implement notifications in which a user subscribes to be notified upon the occurrence of predetermined events. If the event occurs, the notification is dispatched to the user without the user needing to request each notification. Such communication is often termed asynchronous or "push-oriented" since there need not be a user-issued request before each notification.

Due to the number of users and devices that have subscribed to notifications, there are a large number of notifications that traverse various networks. Accordingly, what is desired are methods, systems, and computer program products for delivering notifications in a manner that scales to the current number and variety of notifications delivered and users served, and that delivers notification in an efficient manner. Also, since the number of notifications delivered and users served is subject to change with time, what is desired are methods, systems, and computer program products that scale notification delivery in an efficient manner.

SUMMARY OF THE INVENTION

Methods, systems, and computer program products are described for providing notifications in a manner that efficiently scales to the number and variety of notifications and users being serviced. The present invention may be implemented in a network environment that includes one or more notification sources where notifications are generated in response to an event. The network environment also includes one or more notification sinks to which the generated notifications are to be sent. The notifications traverse a notification service in accordance with the present invention on their way from the notification sources to the notification sinks. The network environment may be, for example, the Internet.

In one example environment, the notifications may be mobile-originated, in which case the notification sources are wireless devices and the notification sinks are mobile service providers that serve a variety of mobile devices. However, the notifications may also be mobile-terminated in which case the notification sources may be mobile service providers or other notification sources, while the wireless devices may be the notification sinks. At a high-level, the notification service performs similar operations for both mobile-originated and mobile-terminated notifications.

The notification service includes a listener component that receives a notification in a network format suitable for transmitting the notification over a network. The listener component receives the notification and translates the notification into an internal processing format used by the notification service. In one example, the network format is an HTTP post request that has the notification content in the body of the HTTP post request. The notification content may be structured within an XML document either directly in the HTTP post request, or perhaps within a SOAP envelope within the HTTP post request.

The notification is then forwarded to a routing component that determines a category associated with the notification, and performs a set of one or more operations on the notification based on its category. Such categories of notifications may include instant messages, news, mobile-originated, or any other conceivable category. Each category has one or more associated operations or transforms that may be performed on notifications of that category. Such transforms include a user profile acquisition, an authorization, an advertisement insertion, a message limit check, a mute check to determine if the notification should be muted, or the like. Finally, the notification service is forwarded to a delivery service for delivery of the notification to the notification sink.

These categorizations of notifications (along with an identification of the corresponding transforms to be performed for notifications of each category) may be stored in a configuration XML document. By making slight changes to the configuration XML document (e.g., by adding or editing nodes in the XML document), one may add different categories of notifications, and edit the transforms that are performed for each category of notifications. Thus, the notification service efficiently scales to different types of notifications.

The listener component, the routing component, and the delivery component may each be scaled in order to adjust for current processing loads. Thus, there may be any number of listener components, routing components, and delivery components. The listener components may have load balancing functionality to determine which of several similar routing components to send the notification to. Likewise, the routing components may have load balancing to determine which of several similar delivery components to send the notification to.

Accordingly, the principles of the present invention provide for an efficiently scalable notification service. Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
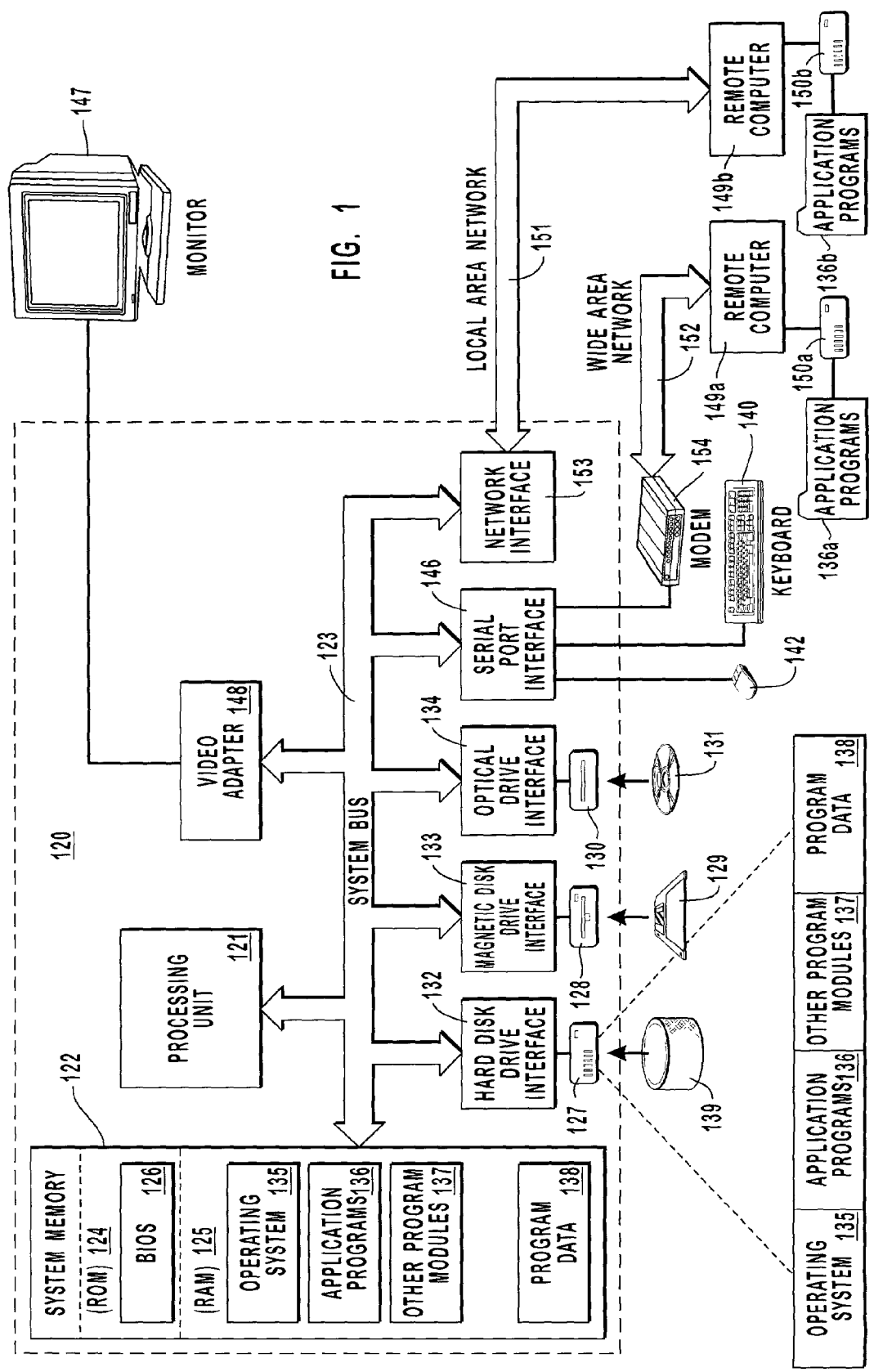
FIG. 1 schematically illustrates a suitable computing device that may implement the principles of the present invention.

The present invention extends to methods, systems and computer program products for providing notifications in a manner that efficiently scales to the number and variety of notifications and users being serviced. The present invention may be implemented in a network environment such as the Internet that includes one or more notification sources where notifications are generated in response to an event. The network environment also includes one or more notification sinks to which the generated notifications are to be sent. The notifications traverse a notification service in accordance with the present invention on their way from the notification sources to the notification sinks.

The notification service includes a listener component that receives a notification in a network format suitable for transmitting the notification over a network. The listener component receives the notification and translates the notification into an internal processing format used by the notification service. The notification is then forwarded to a routing component that determines a category associated with the notification, and performs a set of one or more operations on the notification based on its category. Finally, the notification service is forwarded to a delivery service for delivery of the notification to the notification sink.

The listener component, the routing component, and the delivery component may each be scaled in order to adjust for current processing loads. Thus, there may be any number of listener components, routing components, and delivery components. The listener components may have load balancing functionality to determine which of several similar routing component to send the notification to. Likewise, the routing components may have load balancing to determine which of several similar delivery components to send the notification to.

Embodiments within the scope of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps and acts of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates an example computing system that may itself or in combination with other computing devices implement all or portions of principles of the present invention. The example system includes a general purpose computing device in the form of a conventional computing device 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138.

A user may enter commands and information into the computer 120 through keyboard 140, pointing device 142, or other input devices (riot shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149*a* and 149*b*. Remote computers 149*a* and 149*b* may each be another personal computer, a server, a router, a network PC, a peer device or other common network node, and typically include many or all of the elements described above relative to the computer 120, although only memory storage devices 150*a* and 150*b* and their associated application programs 136*a* and 136*b* have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
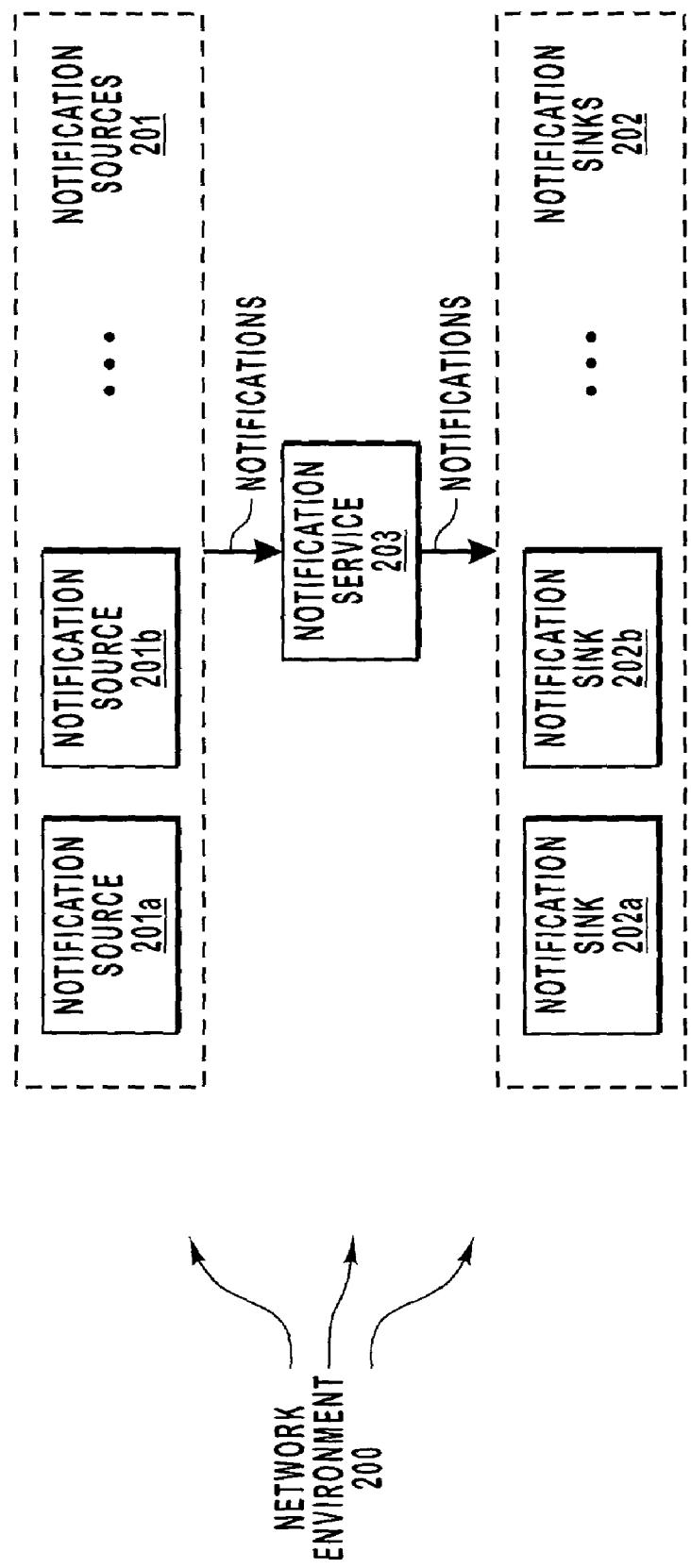
FIG. 2 schematically illustrates a suitable network environment for the present invention including notification sources dispatching notifications to notification sinks via a notification service.

FIG. 2 illustrates a network environment 200 in which the principles of the present invention may be employed. The network environment 200 includes a number of notification sources 201 including, for example, notification sources 201*a* and 201*b* among potentially many others as represented by the horizontal ellipses. These notification sources 201 generate notifications in response to a detected event. The network environment 200 also includes a number of notification sinks 202 including, for example, notification sinks 202*a* and 202*b* among potentially many others. The notification sinks 202 represent applications or devices that consume notifications generated by the notification sources 201. While such applications or devices may be consumer applications and consumer devices, that need not be the case. In one embodiment the notification sinks 202 represent applications, computers, or devices operated by an intermediary service provider that acts as a proxy between the notification service 203 and consumer electronic computers or devices. For example, the notification sink 202 may be a cellular provider, a paging company or the like.

The network environment 200 may be any network environment that includes one or more notification sources and one or more notification sinks. On one extreme, one potential environment is the Internet, which contains enumerable notification sources and sinks. On the other extreme, although two notification sources 201*a* and 201*b* and two notification sinks 202*a* and 202*b* are shown in FIG. 2, the principles of the present invention may be employed in a simple network environment that includes a single notification source and/or a single notification sink. Each notification source and sink may be a computing device and/or an application running thereon.

In accordance with the present invention, a notification service 203 facilitates communication of the notification from the notification sources 201 to the notification sinks 202. The notification service 203 performs appropriate processing on the notification as it passes on its way to its destination notification sink. The kind of processing that is appropriate may vary greatly and depend on the category of the notification. Examples of such appropriate processing are described further below. In one network environment, the number of notifications, notification sources, notification sinks, and users of notification sinks may vary greatly over time. Accordingly, the notification service 203 also scales efficiently to accommodate such changes as will be described further below.

Figure 3:
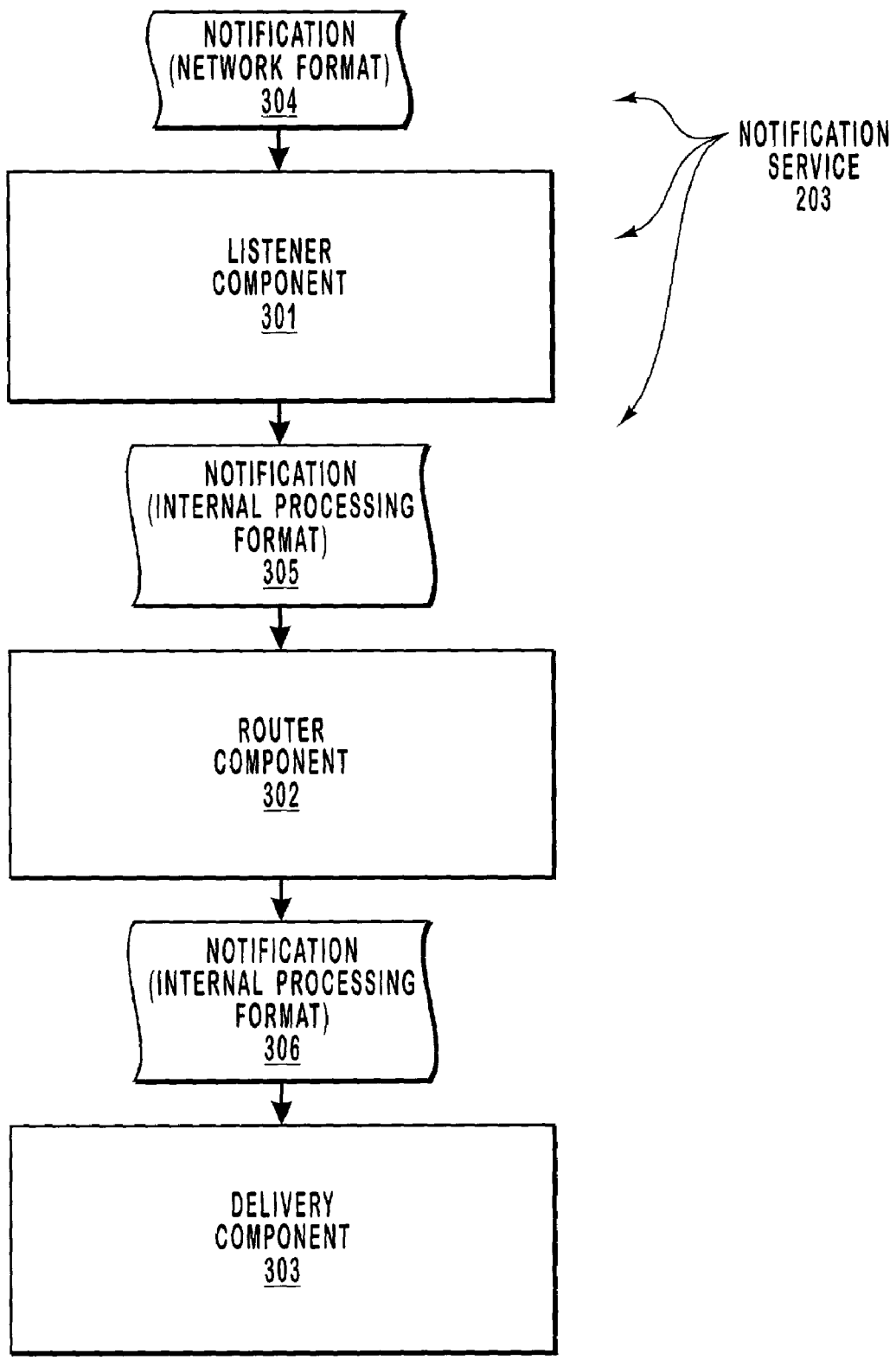
FIG. 3 illustrates, in simplified form, the components of the notification service of FIG. 2.
Figure 4:
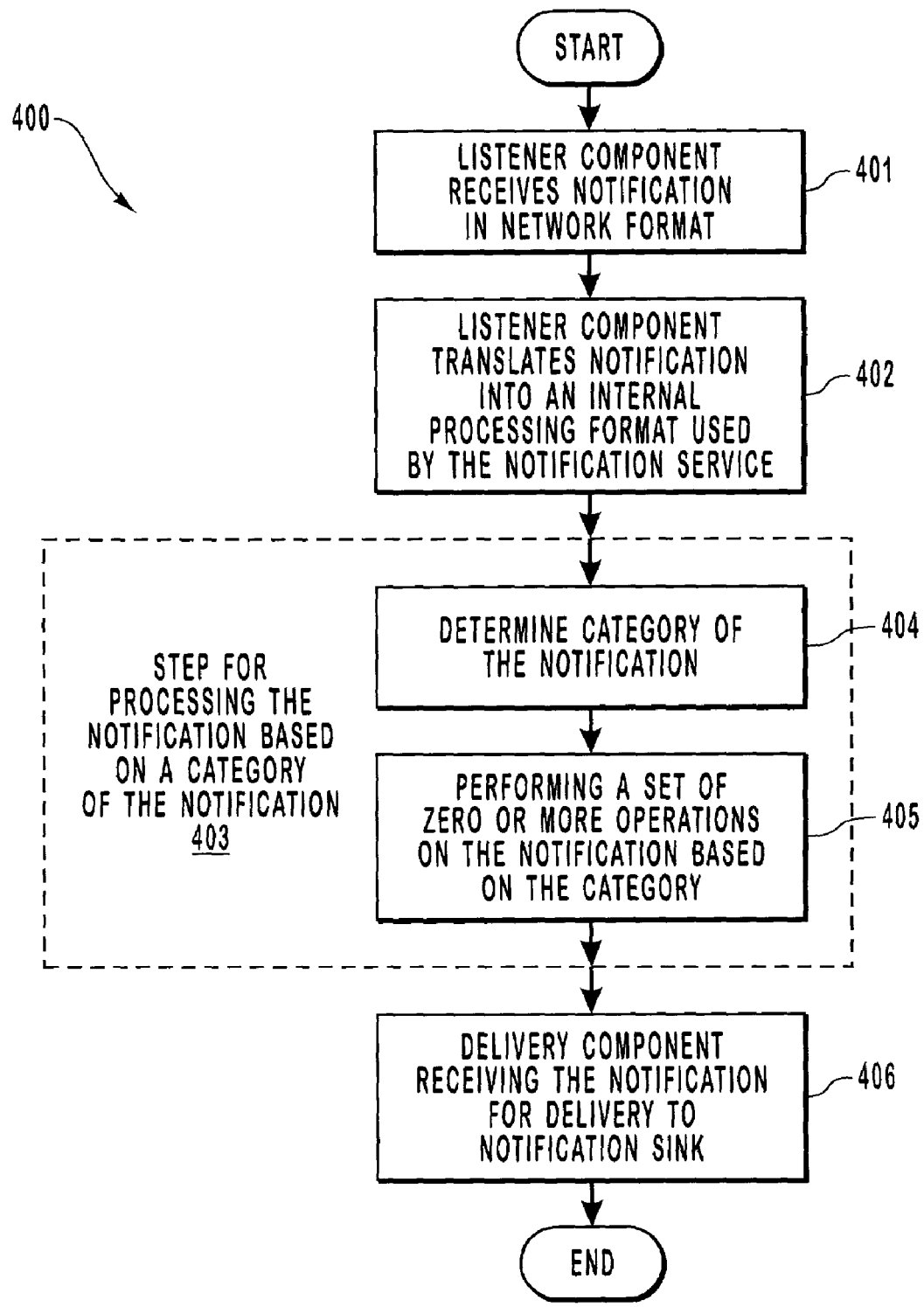
FIG. 4 illustrates a flowchart of a method for delivering notifications from a notification source to a notification sink in accordance with the present invention.

FIG. 3 schematically illustrates, in simplified form, the various components of the notification service 203. Referring to FIG. 4, the notification service 203 performs a method 400 for delivering notifications from a notification source to a notifications sink. The structure of the notification service 203 of FIG. 3 will be now be described with frequent reference to the method 400 of FIG. 4.

Initially, a listener component 301 receives a notification 304 from one of notifications sources 201 (act 401). The notification is received in a network format. The network format may be any format that is suitable for transmission of notifications over a network, whether that format is now defined or to be developed in the future. Examples of a network format include a notification that is structured as an eXtensible Markup Language (XML) document included within the body of a HyperText Transport Protocol (HTTP) post request. That XML document may also be included as the body of a Simple Object Access Protocol (SOAP) message that is itself included within an HTTP post request.

The listener component 301 then translates the notification from the network format into an internal processing format used by the notification service (act 402). That internal processing format may be any format that is convenient for the notification service 203, whether or not that internal processing format is also used external to the notification service.

The notification service 203 then performs a functional step for processing the notification based on a category of the notification (step 403). In particular, the step for processing may include a corresponding act of determining a category of the notification (act 404), and then a corresponding act of performing a set of zero or more operations on the notification in its internal processing format based on the category of the notification (act 405). The set of zero or more operations may usually include at least one operation. However, there may be circumstances in which no operations are performed on notifications of a particular category. The delivery component 303 then receives the notification for delivery to the notification sink (act 406).

The step for processing (step 403) may be performed by the routing component 302, or by a combination of the routing component 302 and the listener component 301. Additionally, further category-specific processing of the notification may occur at the delivery component even after the routing component 302 performs its own category-specific processing of the notification. Thus, category-specific processing of the notification may occur at the listener component 301, the router component 302 and/or at the delivery component 303.

Figure 5:
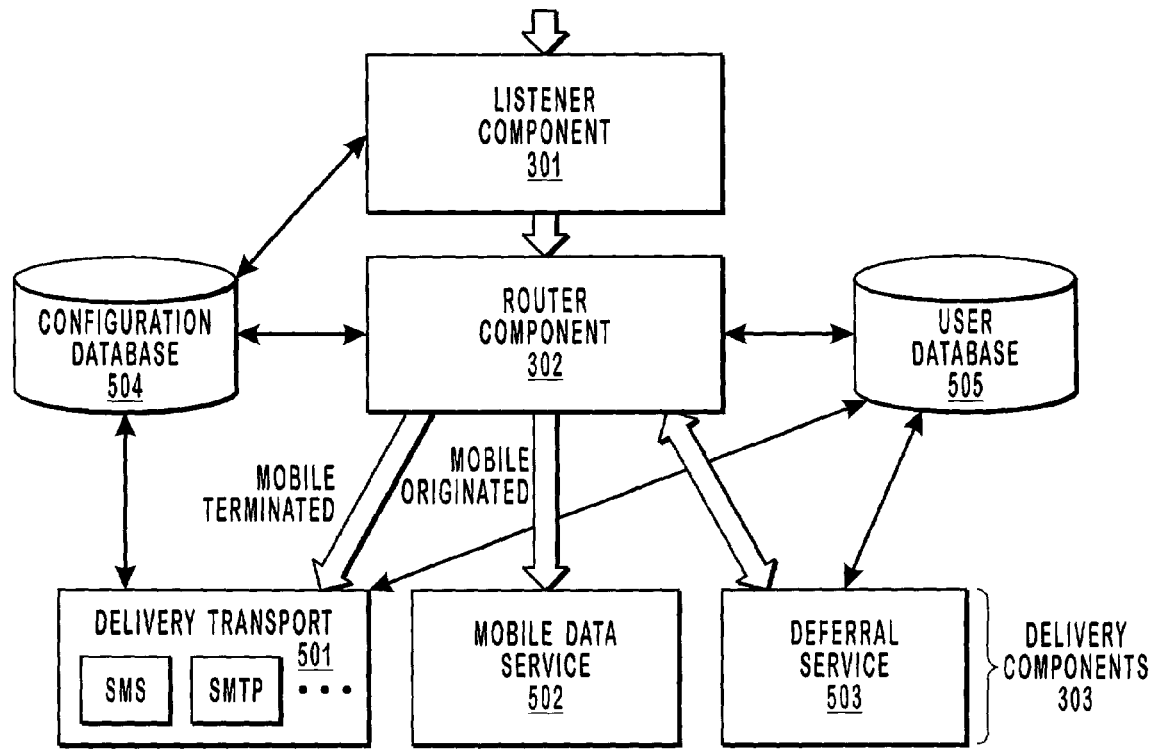
FIG. 5 illustrates, in more detailed form, the components of the notification service of FIG. 2.

FIG. 5 illustrates, in more detail, the structure of the notification service 203. This more specific structure is illustrative only and not limiting. Those of ordinary skill in the art will recognize, after having reviewed this description, that various structures will be capable of implementing the principles of the present invention.

FIG. 5 illustrates that there may be various types of delivery components 303 that may be used depending on the direction that the notification is flowing, and based on whether deferred delivery is warranted. In particular, suppose that the notification sinks are wireless devices. Notifications may be transmitted from a mobile service provider to a mobile device (hereinafter called "mobile-terminated notifications"), or from a mobile device to a service provider (hereinafter called "mobile-originated notifications"). Either direction may be facilitated by the structure of FIG. 3 and FIG. 5.

In particular, for mobile-terminated notifications, the mobile service provider is one of the notification sources 201 of FIG. 2, and the wireless device is one of the notification sinks 202. The notification passes from the wireless device, to the listener component 301, to the router component 302, and to one of the delivery components 303. In the case of mobile-terminated devices, the delivery component 303 is a delivery transport 501 that includes transport modules that may be used with the notification sink. Such transport modules may facilitate transports such as Short Message Service (SMS) and Simple Mail Transfer Protocol (SMTP) that may be used by the wireless carrier that transports the notification over the wireless network to the wireless device.

For mobile-originated notifications, the wireless device is one of the notifications sources 201 and the mobile service provider is one of the notification sinks. For both mobile-terminated and mobile-originated notifications, the notification passes through the listener component 301, through the router component 302, and to one of the delivery components 303. In the case of mobile-originated notifications, however, the delivery component is a mobile service provider such as mobile data service 502, rather than the delivery transport. In this case, the mobile data service 502 acts as both the delivery component and the notification sink.

In some cases, it may not be desirable to immediately deliver a notification. For example, the notification sink or the user of the notification sink may have indicated that she does not want to be notified under certain circumstances. Also, the notification service may have detected a failure to deliver the notification. In such cases, the delivery component (and notification sink) may take the form of a deferral service 503.

The listener component 301, the router component 302, and the delivery transport 504 all have access to a configuration database 504 that stores data that is not specific to a user, but is more general to the notification service 203. For example, the configuration database 504 may identify supported carriers and devices, and identify characteristics associated with such supported carriers and devices such as the number of characters that may be displayed on a particular supported device. A user database 505 stores user-specific information such as account status, user preferences, and user address information.

As mentioned above, the notification service 203 may perform a set of one or more operations (also called herein "transforms") on the notification depending on the caterogy. There are three possible results for each transform; either the notification is dropped, processing continues to the next transform, or processing ends due to the transform being the last to be applied to the notification. Various transforms will now be described, followed by a description of how the category of the notification affects which transforms are applied.

Figure 6:
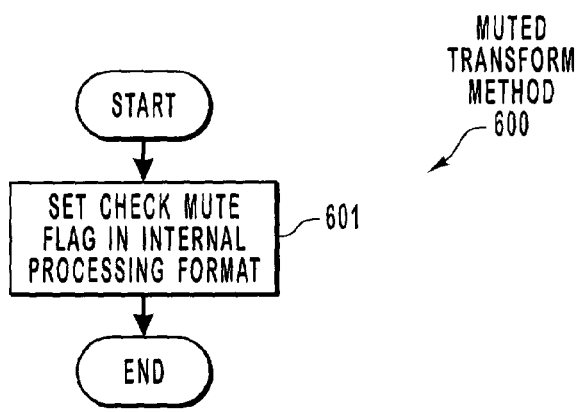
FIG. 6 illustrates a flowchart of a muted transform method that may be implemented by the notification service depending on the category of the notification.

FIG. 6 illustrates a muted transform method 600, which performs a single act of setting a check mute flag in the internal processing format of the notification (act 601). Muting a notification means that the notification is intentionally silenced by not being delivered immediately, if delivered at all. If the check mute flag is not set, then the notification will not be muted. If the check mute flag is set, then it is possible that the notification will be muted depending on the results from the user profile transform described with respect to FIG. 7.

Figure 7:
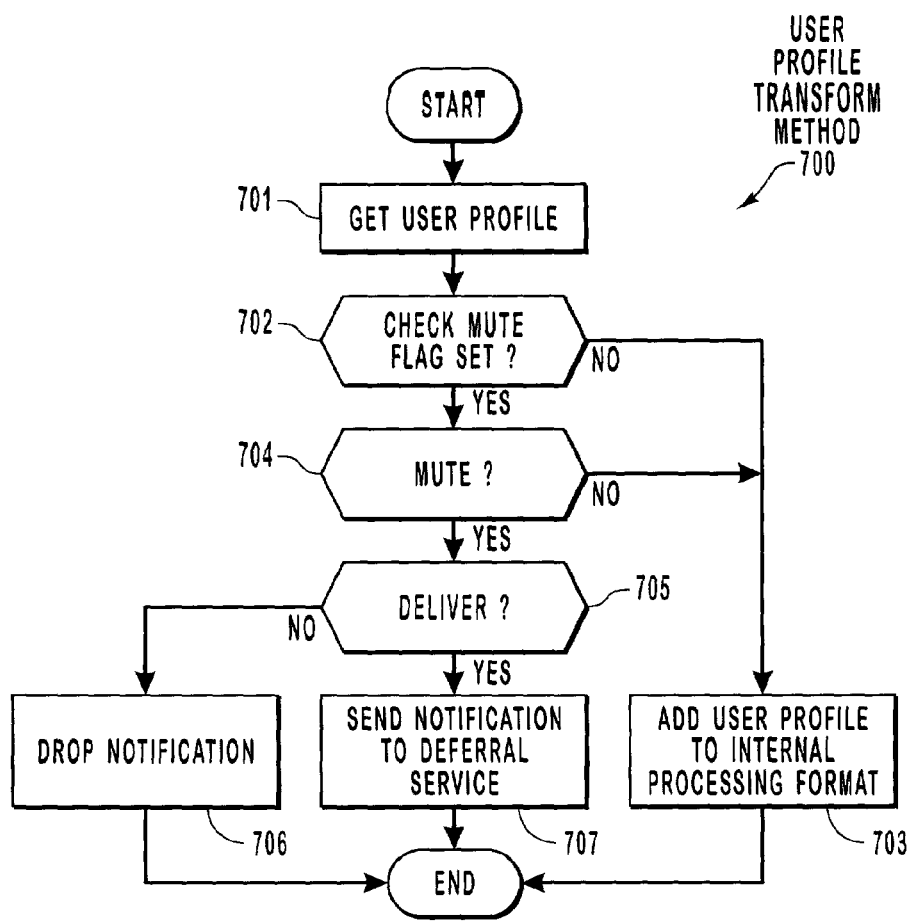
FIG. 7 illustrates a flowchart of a user profile transform method that may be implemented by the notifications service.

FIG. 7 illustrates a user profile transform method 700, which begins by getting the user profile (act 701) associated with the sender of the notification (if a mobile-originated notification) or associated with the receiver of the notification (if a mobile-terminated notification). This user profile may have an identifier that is specific to the user, or an identifier that is specific to a device of the user.

If the check mute flag is not set (NO in decision block 702), then the user profile information is added to the internal processing format of the notification (act 703). Otherwise, if the check mute flag is set (YES in decision block 702), then the transform determines whether the notification should be muted (decision block 704). This decision is based on the user profile information accessed from the database and/or based on other configuration information. Muting may occur if the user's preferences indicate that muting should occur. For example, perhaps it is 2:00 a.m. and the user has indicated that she is not to receive notifications between the hours of 10:00 p.m. and 7:00 a.m. since she will be asleep. Also, muting may occur due to factors other than the user's preference.

If the muting should not occur (NO in decision block 704), then the user profile information is added to the internal processing format of the notification (act 703). Otherwise, if muting should occur (YES in decision block 704), then a determination is made as to whether the notification should be delivered at all (decision block 705). This determination may also be made from the user profile information obtained from the database lookup. If delivery is not to occur (NO in decision block 705), then the notification is dropped (act 706). Otherwise, if delivery is to occur (YES in decision block 705), then the notification is sent to the deferral service 503 for subsequent delivery (act 707).

Figure 8:
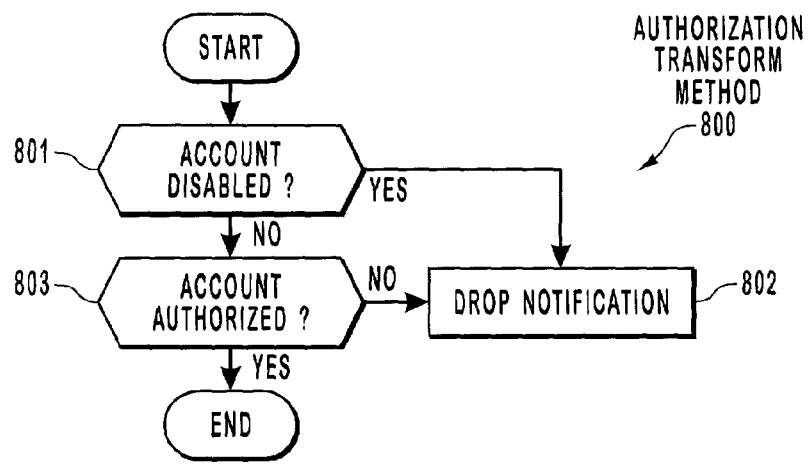
FIG. 8 illustrates a flowchart of an authorization transform method.

FIG. 8 illustrates an authorization transform method 800 in which it is determined whether or not the user is authorized to receive or send the notification. First, the user profile information is consulted to determine whether or not the user's account has been disabled (decision block 801). For example, the carrier may have disabled the user's account due to the user defaulting on obligations or canceling the account. If the account is disabled (YES in decision block 801), then the notification is dropped (act 802). Otherwise, if the account is not disabled (NO in decision block 801), the user profile information is consulted to determine whether the user is authorized to send (or receive) the notification (decision block 803). If not authorized (NO in decision block 803), then the notification is dropped (act 802). Otherwise (YES in decision block 803), the transform ends.

Figure 9:
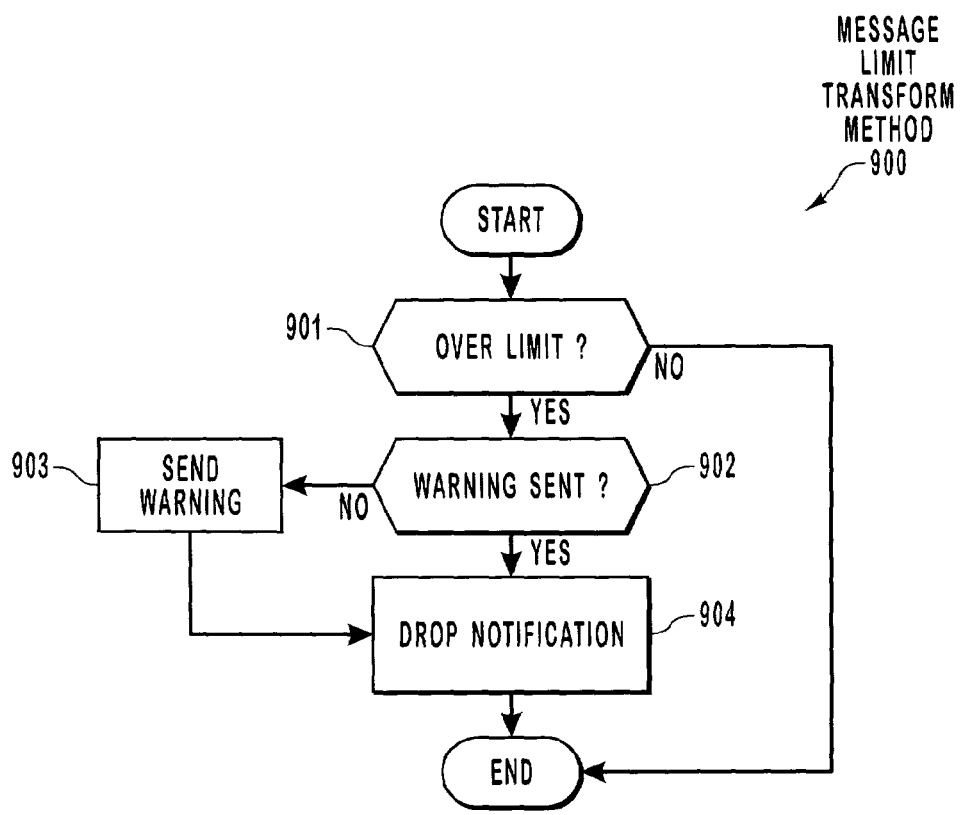
FIG. 9 illustrates a flowchart of a message limit transform method.

FIG. 9 illustrates a message limit transform method 900, which checks to see if any user-set or carrier-set limits are exceeded. The current limit information may have been obtained from the initial database lookup performed during the user profile transform method 700. However, the limit information may also be acquired by a separate database lookup as desired. If the user is not over the limit (NO in decision block 901), then the transform simply ends. If the user is over the limit (YES in decision block 901), then the transform consults the user profile to determine if a warning has been sent (decision block 902). If a warning has not been sent (NO in decision block 902), then a warning is sent (act 903) and then the notification is dropped (act 904). Otherwise, if a warning has been sent (YES in decision block 902), then the notification is simply dropped (act 904) without a warning.

Figure 10:
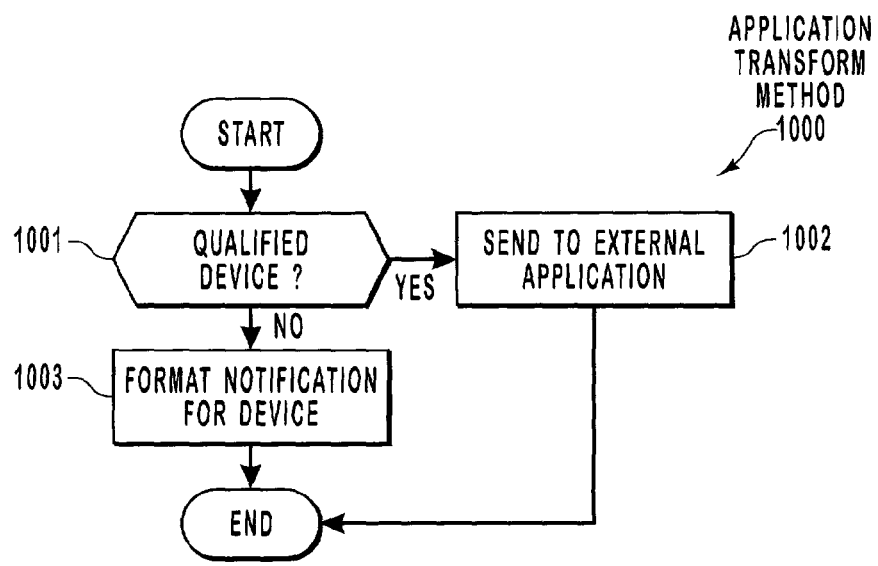
FIG. 10 illustrates a flowchart of an application transform method.

FIG. 10 illustrates an application transform method 1000 in which notifications are generated by an external notification service. Such external notification services often allow the user a mechanism imbedded in the notification itself to respond to the notification. Based on the user profile information, the notification service determines whether the notification sink is a qualified device (decision block 1001). If so (YES in decision block 1001), then the notification service provides the notification to an external application (act 1002) for appropriate facilitation of the external notification service. For example, perhaps the external application would embed the mechanism for responding to the notification into the notification itself.

If the device is not qualified (NO in decision block 1001), then the notification is formatted for the device (act 1003). This formatting takes into consideration the user profile information. When a notification is generated by an external notification service, and the destination device is not compatible with using the full features of that notification service, there may be unnecessary fields within the notification that were intended to facilitate the full features of the external notification service. Accordingly, formatting the notification for the destination device (act 1003) may embody removing those fields. This may be viewed as preliminary formatting.

Figure 11:
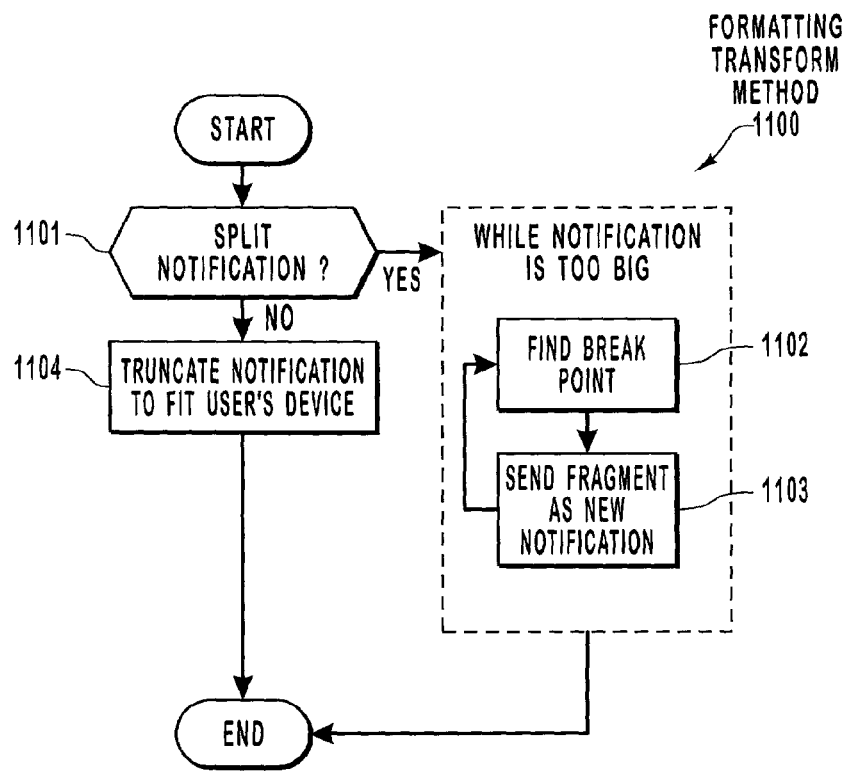
FIG. 11 illustrates a flowchart of a formatting transform method.

FIG. 11 illustrates a formatting transform method 1100 that translates the notification into a format that is acceptable for the destination device. If the user profile information indicates that the user would like the notification split up (YES in decision block 1101) if it is too big, then while the notification is still too big, the transform finds a break point in the notification (act 1102) and sends the fragment as a new notification (act 1103). Otherwise (NO in decision block 901), the notification is truncated to fit the user's device (act 1104).

In one embodiment, the size of the message fragment is determined by the least allowable fragment size taking into account all hops from the notification service to the notification sink. For example, take the case where the notification service first sends the notification to the carrier thus constituting the first hop. Then, the carrier forwards the notification to the wireless device thus constituting the second hop. Suppose that the fragment size allowed by the second hop from the carrier to the wireless device is smaller than the fragment size allowed by the first hop from the notification service to the carrier. The transform would use the fragment size allowed by the second hop from the carrier to the wireless devices in finding the break point in the notification.

Figure 12:
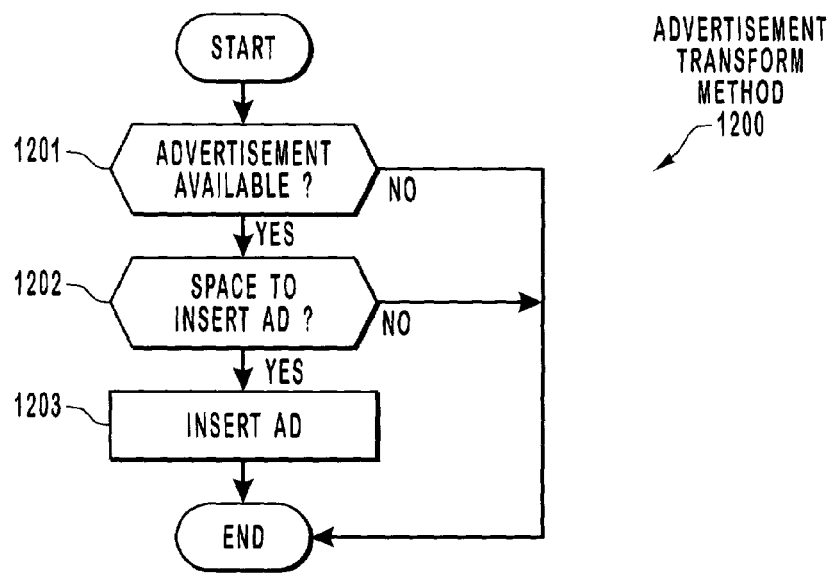
FIG. 12 illustrates a flowchart of an advertisement transform method.

FIG. 12 illustrates an advertisement transform method 1200. It is first determined whether or not there is an advertisement available (decision block 1201). The notification service 203 may make this determination by consulting with the configuration database 504. If there is an advertisement available (YES in decision block 1201), then the transform determines whether there is space available for the advertisement (decision block 1202). If there is space available (YES in decision block 1202), then the advertisement is added (act 1203) to the internal processing format of the notification.

Although seven specific transform methods have been described (namely, the muted, user profile, authorization, message limit, application, formatting, and advertisement transform methods), there may be other transform methods that may be desirable to be performed depending on the category of the notification. The transform methods that are performed depend on the category of the notification. In one embodiment, the types of notifications and the transforms performed based on the notification are defined by an XML document which is now described.

In this example XML document, line numbers are added for purposes of clarity in describing the XML document. These line numbers would not be present in an actual XML document. Consider the first 17 lines of such an XML document as follows:

```
1)   <?xml version="1.0" encoding="UTF-8" ?>
2)   <MobileConfig>
3)     <Notifications>
4)       <TransformsAndFilters>
5)         <Router>
6)           <Process id="1" class="21" desc="Authorization"/>
7)           <Process id="2" class="22" desc="Muted"/>
8)           <Process id="3" class="23" desc="Formatting"/>
9)           <Process id="4" class="24" desc="Application"/>
10)          <Process id="8" class="28" desc="User Profile"/>
11)          <Process id="9" class="29" desc="Message Limit"/>
12)        <Router>
13)        <Transport>
14)          <Process id="6" class="26" desc="Advertisement"/>
15)          <Process id="7" class="27" desc="Message Limit"/>
16)        </Transport>
17)      </TransformsAndFilters>
```

Line 1 identifies the document as complying with version 1.0 of the eXtenstible markup language, and specifies the encoding format of "UTF-8". Line 2 is an opening tag of a top-tier XML element called "MobileConfig". Line 3 is an opening tag of a second-tier XML element called "MobileConfig/Notifications". Line 4 is an opening tag of a third-tier XML element called "MobileConfig/Notifications/TransformsAndFilters" and corresponds to a closing tag at line 17. This indicates that the content from line 5 through line 16 describes available transforms for use when processing notifications.

Line 5 is an opening tag of a fourth-tier XML element called "MobileConfig/Notifications/TransformsAndFilters/Router" and corresponds to a closing tag at line 12. Thus, the content from line 6 through line 11 describes transforms that may be implemented by the routing component 302. Line 6 is an XML element that assigns an identifier of 1 to the authorization transform. Likewise, lines 7, 8, 9, 10 and 11 assign corresponding identifiers of 2, 3, 4, 8 and 9 to the muted, formatting, application, user profile and message limit transforms, respectively. These lines also identify a class associated with each of those transforms.

Line 13 is an opening tag of a fourth-tier XML element called "MobileConfig/Notifications/TransformsAndFilters/Transport" and corresponds to a closing tag at line 16. Thus, the content from line 14 and line 15 describes transforms that may be implemented by the delivery transport component 501. Line 14 is an XML element that assigns an identifier of "6" to the advertisement transform. Line 15 is an XML element that assigns an identifier of "7" to the message limit transform. Note that the message limit transform may be implemented by either the router component 302 (see line 11) or the delivery transport component 501. However, the message limit transform is assigned a different identifier and is of a different class depending on whether the transform is executed by the router component 302 or the delivery transport component 501. In this manner, the third-tier XML element called "MobileConfig/Notifications/TransformsAndFilters" defines the available transforms, and where those transforms may be implemented.

The next portion of the XML document defines categories of notifications, what transforms are performed for each category, and in what order. Consider the following XML fragment:

```
18)   <Categories>
19)     <Category id="None" desc="Default">
20)       <TFP id="2"/>
21)       <TFP id="8"/>
22)       <TFP id="1"/>
23)       <TFP id="3"/>
24)       <TFP id="7"/>
25)     </Category>
```

Line 18 is an opening tag of a third-tier XML element called "MobileConfig/Notifications/Categories". Line 19 through 25 describe transforms that are to be performed by default when no notification category is detected. These transforms are 2, 8, 1, 3 and 7 in order. In other words, the router component 302 performs the muted, user profile, authorization and formatting transforms in order, followed by the delivery transport component 501 performing the message limit transform.

Consider the following XML fragment that describes how to process a notification of the "Instant Message" category:

```
26)   <Category id="110110001" desc="Instant Message">
27)     <TFP id="8"/>
28)     <TFP id="1"/>
29)     <TFP id="4"/>
30)     <TFP id="7"/>
31)   </Category>
```

This XML fragment indicates that the router component 302 performs the user profile, authorization and application transforms in order, followed by the delivery transport component 501 performing the message limit transform.

Consider the following XML fragment that describes how to process a notification of the "Buddy List Request" category:

```
32)   <Category id="110110002" desc="Buddy List Request">
33)     <TFP id="8"/>
34)     <TFP id="1"/>
35)     <TFP id="4"/>
36)   </Category>
```

This XML fragment indicates that the router component 302 performs the user profile, authorization and application transforms in order. The delivery transport component 501 does not perform any transforms. The following XML fragment indicates an identical transform processing order for Buddy List Response notifications.

```
37)    <Category id="110110003" desc="Buddy List Response">
38)        <TFP id="8"/>
39)        <TFP id="1"/>
40)        <TFP id="4"/>
41)    </Category>
```

Consider the following XML fragment that describes how to process a notification of the "News" category:

```
42)    <Category id="111100403" desc="News">
43)        <TFP id="2"/>
44)        <TFP id="8"/>
45)        <TFP id="1"/>
46)        <TFP id="3"/>
47)        <TFP id="7"/>
48)        <TFP id="6"/>
49)    </Category>
```

This XML fragment indicates that the router component 302 performs the muted, user profile, authorization and formatting transforms in order, followed by the delivery transport component 501 performing the message limit and advertisement transforms in order.

Consider the following XML fragment that describes how to process a notification of the "External Application" category as when an external application generates an alert designed for the recipient to be able to respond to:

```
50)    <Category id="111100406" desc="External Application">
51)        <TFP id="2"/>
52)        <TFP id="8"/>
53)        <TFP id="1"/>
54)        <TFP id="4"/>
55)        <TFP id="7"/>
56)    </Category>
```

This XML fragment indicates that the router component 302 performs the muted, user profile, authorization, and application transforms in order, followed by the delivery transport component 501 performing the message limit transform.

Consider the following XML fragment that describes how to process a notification of the "MessageLimit" category:

```
57)    <Category id="111100407" desc="MessageLimit">
58)        <TFP id="8"/>
59)        <TFP id="1"/>
60)    </Category>
```

Such a message limit notification may be, for example, the warning sent in act 903 of FIG. 9. This XML fragment indicates that the router component 302 performs the user profile and authorization transforms in order.

The following XML fragment identifies similar transform processing for notifications that are authorization codes, as when as user is providing authentication information to the notification service.

```
61)    <Category id="111100408" desc="AuthCode">
62)        <TFP id="8"/>
63)        <TFP id="1"/>
64)    </Category>
```

The following indicates a transform order when processing notification identified as mobile-originated.

```
65)    <Category id="111100450" desc="Mobile-originated Message">
66)        <TFP id="8"/>
67)        <TFP id="9"/>
68)    </Category>
```

In the case of mobile-originated message, the router component 302 performs the user profile and message limit transforms in order.

the following XML fragment identifies the transform order when the notification is of the category "all" indicating that all of the transforms are to be performed.

```
69)    <Category id = "100000000" desc = "All"/>
70)        <TFP id = "2"/>
71)        <TFP id = "8"/>
72)        <TFP id = "1"/>
73)        <TFP id = "3"/>
74)        <TFP id = "7"/>
75)        <TFP id = "6"/>
76)    </Category>
```

In this case, the router component 302 would perform the muted, user profile, authorization and formatting transforms in order, followed by the delivery transport component 501 performing the message limit and advertisement transforms in order. The following XML fragment completes the XML document.

```
77)        </Categories>
76)    </Notifications>
77) </MobileConfig>
```

Line 75 is the closing tag corresponding to the opening tag on line 18. Thus, lines 18 through 75 represent a third-tier XML element called "MobileConfig/Notifications/Categories" that describes the transform processing performed for various notification categories.

Line 76 is a closing tag corresponding to the opening tag on line 3. Thus, lines 3 through 76 represent a second-tier XML element called "MobileConfig/Notifications" that describes notification configuration information.

Line 77 is a closing tag corresponding to the opening tag on line 2, thus completing the top-tier XML element called "MobileConfig". It will be apparent to those of ordinary skill in the art, after having reviewed this description, that the XML document may be extended as desired to include a variety of information that may be less relevant to the principles of the present invention.

From the above-description, it is apparent that the notification service 203 may perform appropriate transform processing on a variety of different types of notifications. Should a new type of notification arise, one may use the principles described herein to define a new notification category and describe a transform order to perform on notifications of that category. Thus, the notification service 203 efficiently scales to a wide variety of different notification types.

Figure 13:
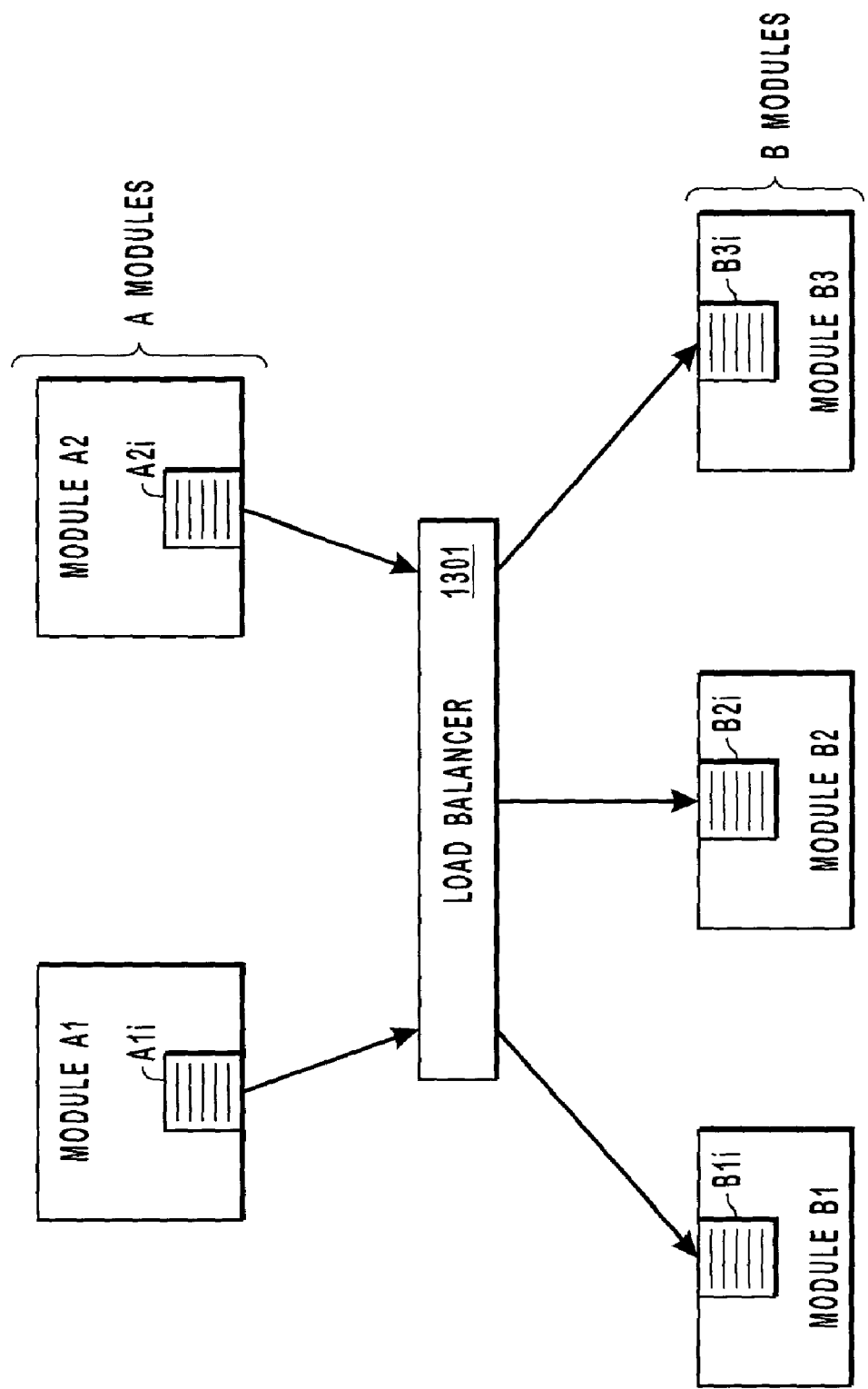
FIG. 13 illustrates a load balancing scaling mechanism.

The notification service 203 also may scale in the number of raw notifications and users that may be accommodated. Note that the notification service has been compartmentalized to include a listening component 301, a router component 302, and a delivery component 303 such as a delivery transport component 501. FIG. 13 illustrates a scaling mechanism that may used to scale the notification service in accordance with the principles of the present invention, so that the number of each type of components may be efficiently adjusted to accommodate for current workloads.

Referring to FIG. 13 are two modules of type A, namely module A1 and module A2. Each of the A modules perform identical processing. There are three modules of type B, namely module B1, module B2 and module B3. Each of the B modules also performs identical processing with respect to each other. A notification may first be processed at one of the A modules followed by being processed at one of the B modules. The processing of a notification is stateless, such that it does not matter which of the A modules processes the notification, and which of the B modules processes the notification after the A modules.

Each of the A modules has an outgoing queue (e.g., a MICROSOFT® MSMQ). For example, module A1 has an outgoing queue A1$i$, and module A2 has an outgoing queue A2$i$. The outgoing queue is an asynchronous background process that facilitates the orderly transfer of queued items from the outgoing queue to a load balancer 1301. The load balancer 1301 determines which of the B modules to send the notification to. The load balancer then provides the notification to the appropriate incoming queue. For example, module B1 has an incoming queue B1$i$, module B2 has an incoming queue B2$i$, and module B3 has an incoming queue B3$i$. In one embodiment, the TCP/IP protocol set may be used to communicate from the outgoing queue to the incoming queue.

Figure 14:
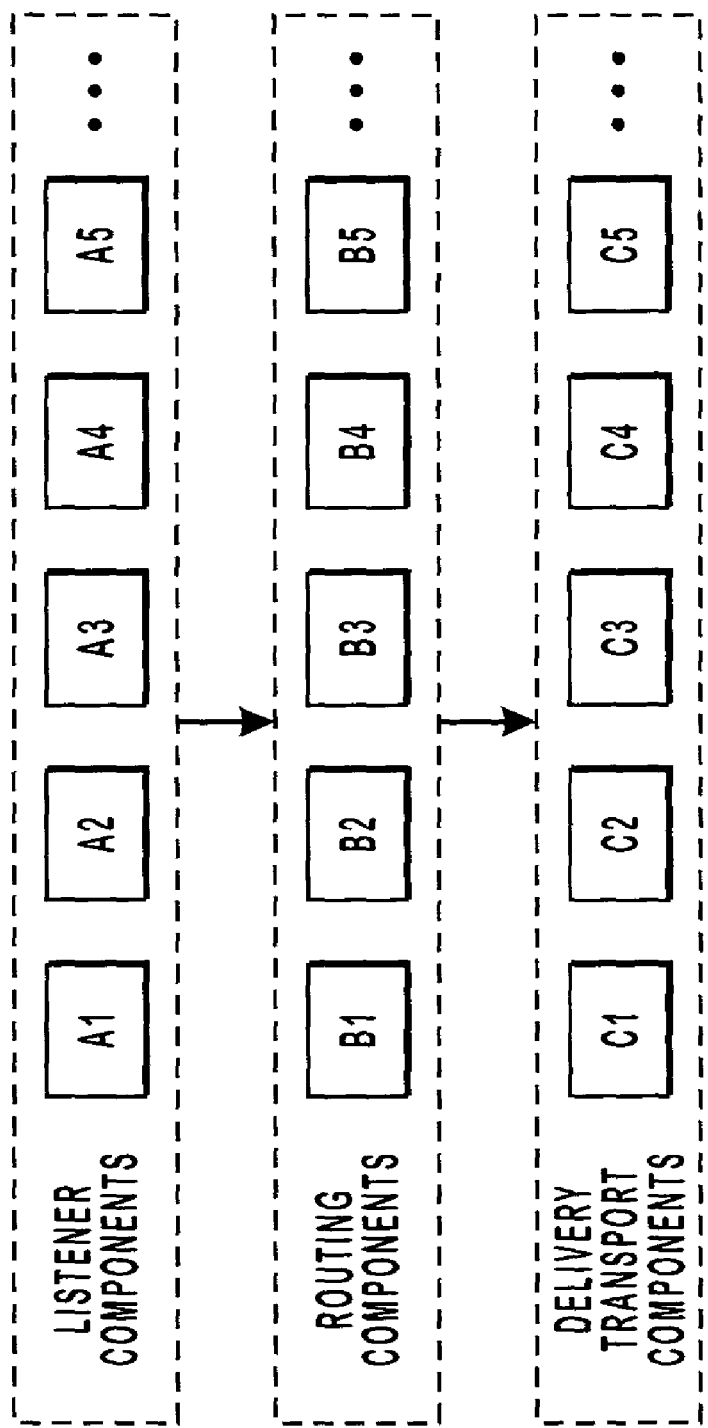
FIG. 14 illustrates the load balancing scaling mechanisms as applied to router, and delivery transport components used by the notification service.

FIG. 14 shows the affect of applying the load balancing aspects of FIG. 13 to the delivery component, the router component and the delivery transport component of FIG. 5. Note that a number of delivery components A1 through A5, router components B1 through B5 and delivery transport components C1 through C5 are illustrated. The number of each type of component may be adjusted as needed.

Figure 15:
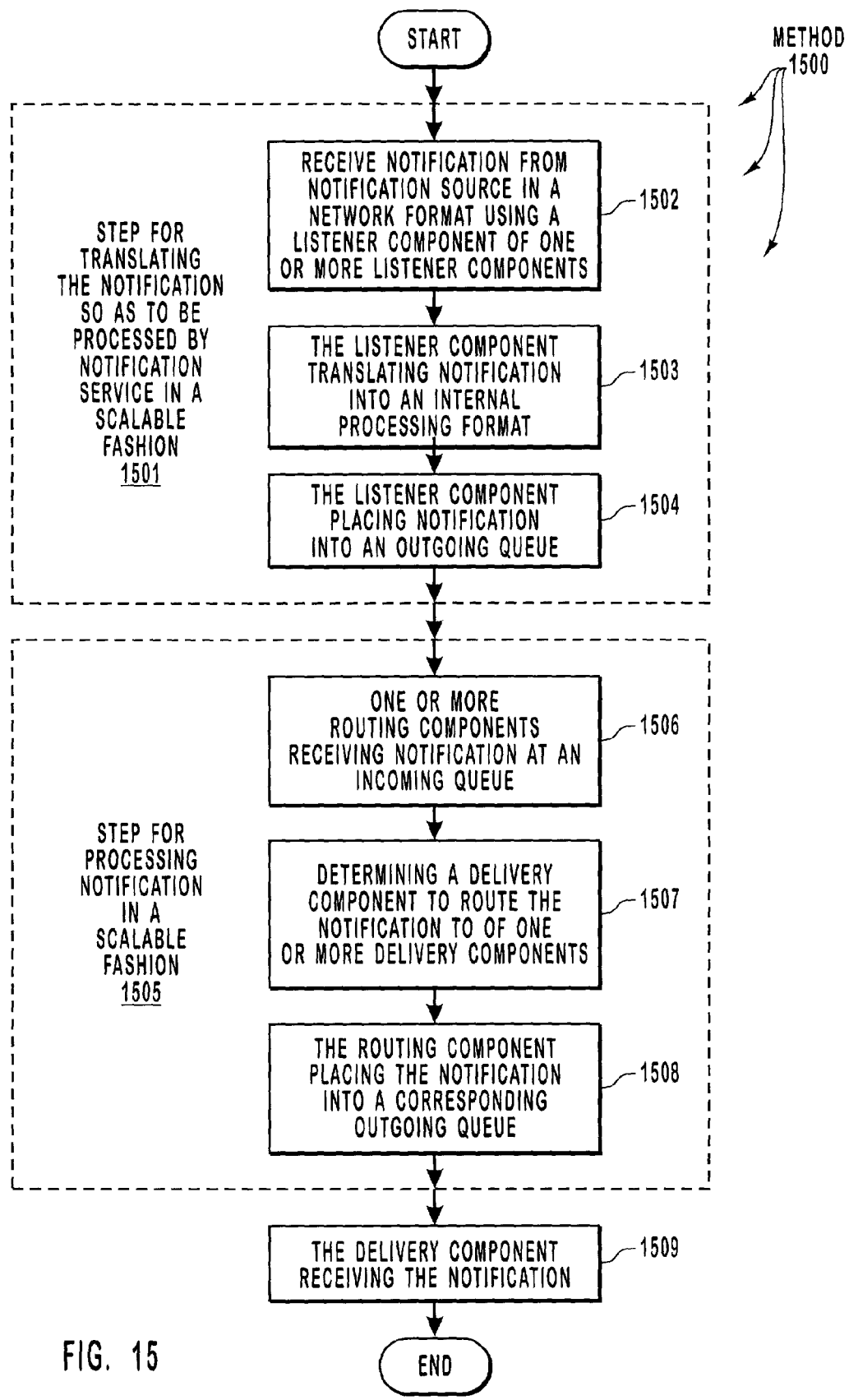
FIG. 15 illustrates a flowchart of a method for delivering notifications in a manner in accordance with the present invention.

FIG. 15 illustrates a flowchart of a method 1500 for delivering notifications from a notification source to a notification sink. The method includes a step for translating the notification so as to be processed by the notification service in a scalable fashion (step 1501). This functional result-oriented step includes any corresponding acts for accomplishing this result. In the illustrated embodiment, this step includes corresponding acts 1502, 1503 and 1504.

In particular, the notification service receives a notification from the notification source in a network format using a listener component of one or more listener components (act 1502). As mentioned previously, this network format may be, for example, an HTTP post request with the notification content being structure in an XML document that is either included directly in the body of the HTTP post message, or else is included within a SOAP message that is within the body of the HTTP post message.

The listener component translates the notification from the network format into an internal processing format used by the notification service (act 1503). The listener component then places the notification in its internal processing format into a corresponding outgoing queue (act 1504). That outgoing queue may be selected by the load balancing associated with the listener component such that the notification is sent to an appropriate router component when considering the current workloads of all of the available router components.

The method 1500 then includes the functional, result-oriented step for processing the notification in a scalable fashion (act 1505). Although this may include any corresponding acts for accomplishing this functional step, the illustrated embodiments shows the step 1505 as including corresponding acts 1506, 1507 and 1508.

Specifically, a routing component of one or more routing components receives the notification from the outgoing queue corresponding to the listener component at a corresponding incoming queue (act 1506). Then, the routing component determines a delivery component to route the notification to of one or more delivery components (act 1507). The routing component then places the notification in a corresponding outgoing queue (act 1508).

The delivery component then receives the notification and delivers the notification to the notification sink (act 1509). It should be noted that if the notification sink is a local application as may be the case if the notification is a mobile-originated notification, the delivery component may be a local delivery module or even an Application Program Interface (API). However, in the case of mobile-terminated notifications, the delivery module may be, for example, one of the delivery transport modules 501.

Accordingly, the principles of the present invention allow for wide variety of notification to be processed appropriately using a set of one or more operations or transforms. In addition, the notification service in accordance with the present invention efficiently scales as appropriate to the raw number of notifications and users serviced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is.

The invention claimed is:

1. In a network environment comprised of one or more computer or devices such as mobile devices that serve as notification sources, meaning that such computer or devices serve as sources where notifications are generated in response to an event, such notifications being generated in a network format comprised of an XML document included within an HTTP post request or included with a SOAP message that is included within an HTTP post request, and wherein the network is also comprised of one or more computers or devices that serve as notification sinks, meaning that such computer or devices serve as destinations on the network where the generated notifications are to be sent, a method for delivering such notifications from a notification service that scales the notifications to the number and variety of notification sources and notification sinks at the time such notifications are generated and delivered, the method comprising:

(a) receiving, at a listening component of the delivery service, a notification generated by a notification source in a network format comprised of an XML document included within an HTTP post request, notification content of the notification being structured within the XML document that identifies data including a category of notification and transform operations associated with the category that may be performed on notifications of the particular category;

(b) translating the notification into an internal processing format (c) forwarding the translated notification to a routing component of the notification service where categorizations of notifications that may be received are stored in an XML configuration document, wherein each of the categories has associated transform operations that may be performed for that category;

(d) referencing the XML configuration document at the routing component to determine a category associated with the notification and performing at the routing component one or more of the associated transform operations on the notification content of the XML document;

(e) forwarding the notification from the routing component to a delivery component of the notification service for delivery to the notification sinks of the network;

(f) changing the XML configuration document at the router by adding or deleting nodes of the XML document to add or delete different categories of notifications, and editing transform operations consistent with the added or deleted categories; and (g) repeating parts (a) through (e) for any subsequent notification corresponding to the changed categories of notifications.

2. The method of claim 1, wherein the listener component of the notification service receives the notification from a wireless device.

3. The method of claim 2, further comprising:
an act of delivering the notification to a mobile service provider.

4. The method of claim 1, wherein the listener component of the notification service receives the notification from a mobile service provider.

5. The method of claim 4, further comprising:
an act of delivering the notification to a wireless device.

6. The method of claim 1, wherein the act of referencing the configuration XML document at the routing component to determine a category associated with the notification comprises:
determining that the notification is an instant message.

7. The method of claim 1, wherein the act of referencing the configuration XML document at the routing component to determine a category associated with the notification comprises:
an act of failing to detect any category associated with the notification; and
an act of determining that the notification is of a default category based on the failure to detect any category associated with the notification.

8. The method of claim 1, wherein the act of referencing the configuration XML document at the routing component to determine a category associated with the notification comprises:
determining that the notification is a buddy list-related notification.

9. The method of claim 1, wherein the act of referencing the configuration XML document at the routing component to determine a category associated with the notification comprises:
determining that the notification is a news-related notification.

10. The method of claim 1, wherein the act of referencing the configuration XML document at the routing component to determine a category associated with the notification comprises:
determining that the notification is a mobile-originated notification.

11. The method of claim 1, wherein the act of performing one or more transform operations on the notification content based on the category associated with the notification comprises:
determining whether to check that the notification should be muted.

12. The method of claim 1, wherein the act of performing one or more transform operations on the notification content based on the category associated with the notification comprises:
accessing a user profile associated with a sender or receiver of the notification.

13. The method of claim 1, wherein the act of performing one or more transform operations on the notification content based on the category associated with the notification comprises:
authenticating the notification by verifying whether a user account is disabled or authorized.

14. The method of claim 1, wherein the act of performing one or more transform operations on the notification content based on the category associated with the notification comprises:
inserting an advertisement into the notification.

15. The method of claim 1, wherein the act of performing one or more transform operations on the notification content based on the category associated with the notification comprises:
formatting the notification for the notification sink.

16. The method of claim 1, wherein the act of performing one or more transform operations on the notification content based on the category associated with the notification comprises:
determining whether a user has exceeded a message limit.

17. The method of claim 1, wherein the act of performing one or more transform operations on the notification content based on the category associated with the notification comprises:
determining the transform operations to perform based on the category.

18. The method of claim 17, further comprising an act of determining the order of operations to perform based on the category.

19. The method of claim 1, further comprising a step for scaling the notification service in order to take into account the changes in the number of notification sources or notification sinks on the network, the scaling being performed by:
providing the listener, routing, and delivery components of the notification service with a plurality of identical modules for performing the functions of the listener, routing, and delivery components;
providing each of the listener, routing, and delivery components with a load balancing function that distributes a received notification to one of the modules of that component; and
changing the number of modules at one or more of the listener, routing, and delivery components in order to take into account changes in the number of notification sources or notification sinks on the network.

20. In a network environment comprised of one or more computer or devices such as mobile devices that serve as notification sources, meaning that such computer or devices serve as sources where notifications are generated in response to an event, such notifications being generated in a network format comprised of an XML document included within an HTTP post request or included with a SOAP message that is included within an HTTP post request, and wherein the network is also comprised of one or more computers or devices that serve as notification sinks, meaning that such computer or devices serve as destinations on the network where the generated notifications are to be sent, a computer program product for implementing a method for delivering such notifications from a notification service that scales the notifications to the number and variety of notification sources and notification sinks at the time such notifications are generated and delivered, the method comprising:

(a) receiving, at a listening component of the delivery service, a notification generated by a notification source in a network format comprised of an XML document included within an HTTP post request, notification content of the notification being structured within the XML document that identifies data including a category of notification and transform operations associated with the category that may be performed on notifications of the particular category;

(b) translating the notification into an internal processing format (c) forwarding the translated notification to a routing component of the notification service where categorizations of notifications that may be received are stored in an XML configuration document, wherein each of the categories has associated transform operations that may be performed for that category;

(d) referencing the XML configuration document at the routing component to determine a category associated with the notification and performing at the routing component one or more of the associated transform operations on the notification content of the XML document;

(e) forwarding the notification from the routing component to a delivery component of the notification service for delivery to the notification sinks of the network;

(f) changing the XML configuration document at the router by adding or deleting nodes of the XML document to add or delete different categories of notifications, and editing transform operations consistent with the added or deleted categories; and (g) repeating parts (a) through (e) for any subsequent notification corresponding to the changed categories of notifications.

21. The computer program product of claim 20, wherein the listener component of the notification service receives the notification from a wireless device.

22. The computer program product of claim 21, further comprising:
an act of delivering the notification to a mobile service provider.

23. The computer program product of claim 20, wherein the listener component of the notification service receives the notification from a mobile service provider.

24. The computer program product for implementing the method of claim 23, further comprising:
an act of delivering the notification to a wireless device.

25. The computer program product of claim 20, wherein the act of referencing the configuration XML document at the routing component to determine a category associated with the notification comprises:
determining that the notification is an instant message.

26. The computer program product of claim 20, wherein the act of referencing the configuration XML document at the routing component to determine a category associated with the notification comprises:
an act of failing to detect any category associated with the notification; and
an act of determining that the notification is of a default category based on the failure to detect any category associated with the notification.

27. The computer program product of claim 20, wherein the act of referencing the configuration XML document at the routing component to determine a category associated with the notification comprises:
determining that the notification is a buddy list-related notification.

28. The computer program product of claim 20, wherein the act of referencing the configuration XML document at the routing component to determine a category associated with the notification comprises:
determining that the notification is a news-related notification.

29. The computer program product of claim 20, wherein the act of referencing the configuration XML document at the routing component to determine a category associated with the notification comprises:
determining that the notification is a mobile-originated notification.

30. The computer program product of claim 20, wherein the act of performing one or more transform operations on the notification content based on the category associated with the notification comprises:
determining whether to check that the notification should be muted.

31. The computer program product of claim 20, wherein the act of performing one or more transform operations on the notification content based on the category associated with the notification comprises:
accessing a user profile associated with a sender or receiver of the notification.

32. The computer program product of claim 20, wherein the act of performing one or more transform operations on the notification content based on the category associated with the notification comprises:
authenticating the notification by verifying whether a user account is disabled or authorized.

33. The computer program product of claim 20, wherein the act of performing one or more transform operations on the notification content based on the category associated with the notification comprises:
inserting an advertisement into the notification.

34. The computer program product of claim 20, wherein the act of performing one or more transform operations on the notification content based on the category associated with the notification comprises:
formatting the notification for the notification sink.

35. The computer program product of claim 20, wherein the act of performing one or more transform operations on the notification content based on the category associated with the notification comprises:
determining whether a user has exceeded a message limit.

36. The computer program product of claim 20, wherein the act of performing one or more transform operations on the notification content based on the category associated with the notification comprises:

determining the transform operations to perform based on the category.

37. The computer program product of claim 36, further comprising an act of determining the order of operations to perform based on the category.

38. The computer program product of claim 20, further comprising a step for scaling the notification service in order to take into account the changes in the number of notification sources or notification sinks on the network, the scaling being performed by:

provinding the listener, routing, and delivery components of the notification service with a plurality of identical modules for performing the functions of the listener, routing, and delivery components;

providing each of the listener, routing, and delivery components with a load balancing function that distributes a received notification to one of the modules of that component; and changing the number of modules at one or more of the listener, routing, and delivery components in order to take into account changes in the number of notification sources or notification sinks on the network.

\* \* \* \* \*

UNITED STATES PATENT AND TRADEMARK OFFICE
CERTIFICATE OF CORRECTION

PATENT NO. : 7,024,459 B2
APPLICATION NO. : 10/086792
DATED : April 4, 2006
INVENTOR(S) : Donald James McNamara et al.

It is certified that error appears in the above-identified patent and that said Letters Patent is hereby corrected as shown below:

On the title page, in item (56), under "U.S. Patent Documents", in column 1, line 11, after "6,697,924" delete "B1" and insert -- B2 --, therefor.

On the title page, in item (56), under "U.S. Patent Documents", in column 2, line 1, after "6,854,035" delete "B1" and insert -- B2 --, therefor.

On the title page, in item (56), under "Other Publications", in column 2, line 2, delete "p." and insert -- pp. --, therefor.

In column 3, line 56, after "applied to" insert -- listener, --.

In column 3, line 59, after "in a" insert -- scalable --.

In column 5, line 62, delete "riot" and insert -- not --, therefor.

In column 6, line 53, after "embodiment" insert -- , --.

In column 11, line 33, delete "<Router>" and insert -- </Router> --, therefor.

In column 14, line 21, delete "the following" and insert -- The following --, therefor.

In column 15, line 43, delete "component and" and insert -- component, and --, therefor.

In column 16, line 46, delete "is." and insert -- is: --, therefor.

In column 17, line 8, in Claim 1, after "format" insert -- ; --.

UNITED STATES PATENT AND TRADEMARK OFFICE
CERTIFICATE OF CORRECTION

PATENT NO. : 7,024,459 B2
APPLICATION NO. : 10/086792
DATED : April 4, 2006
INVENTOR(S) : Donald James McNamara et al.

It is certified that error appears in the above-identified patent and that said Letters Patent is hereby corrected as shown below:

In column 19, line 29, in Claim 20, after "format" insert -- ; --.

Signed and Sealed this

Eleventh Day of August, 2009

David J. Kappos
*Director of the United States Patent and Trademark Office*